Jan. 20, 1953  F. C. GONZALEZ  2,626,179
CONVERTIBLE TRUCK AND TRUNK COMPARTMENT FOR AUTOMOBILES
Filed Dec. 2, 1949 2 SHEETS—SHEET 1
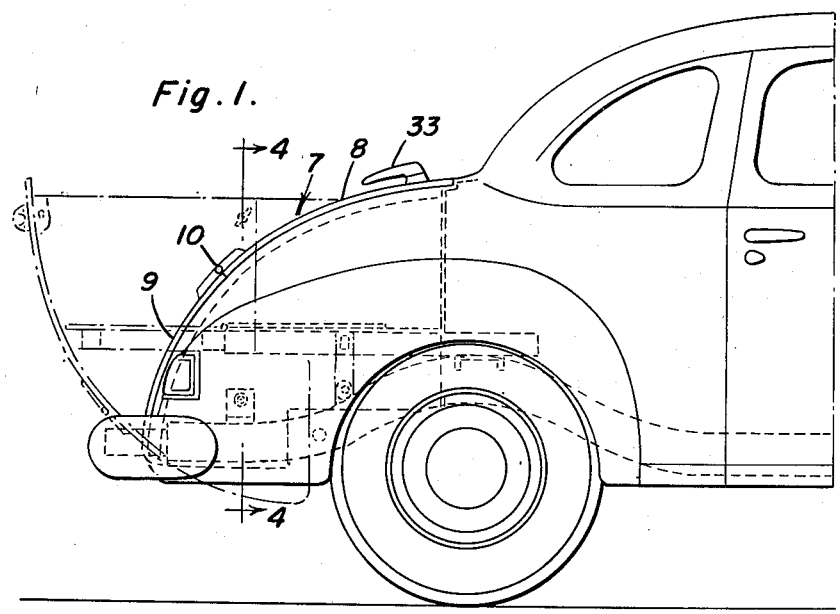
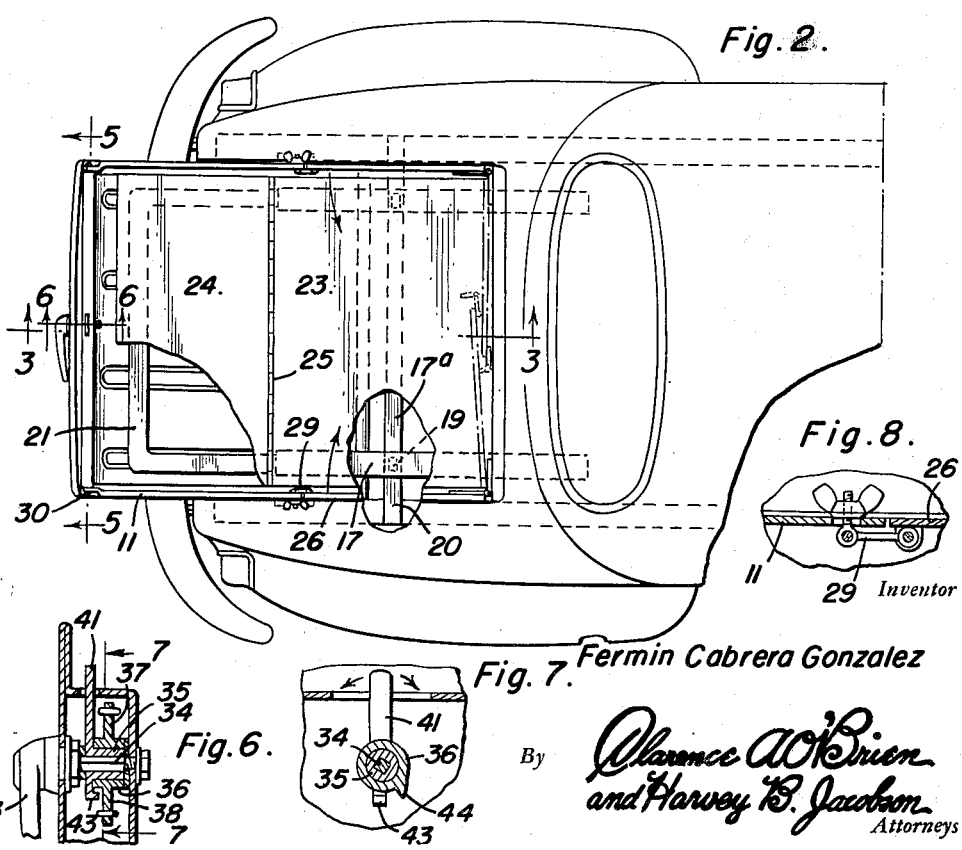
Inventor
Fermin Cabrera Gonzalez
By Clarence A. O'Brien
and Harvey B. Jacobson
Attorneys Jan. 20, 1953   F. C. GONZALEZ   2,626,179
CONVERTIBLE TRUCK AND TRUNK COMPARTMENT FOR AUTOMOBILES
Filed Dec. 2, 1949   2 SHEETS—SHEET 2
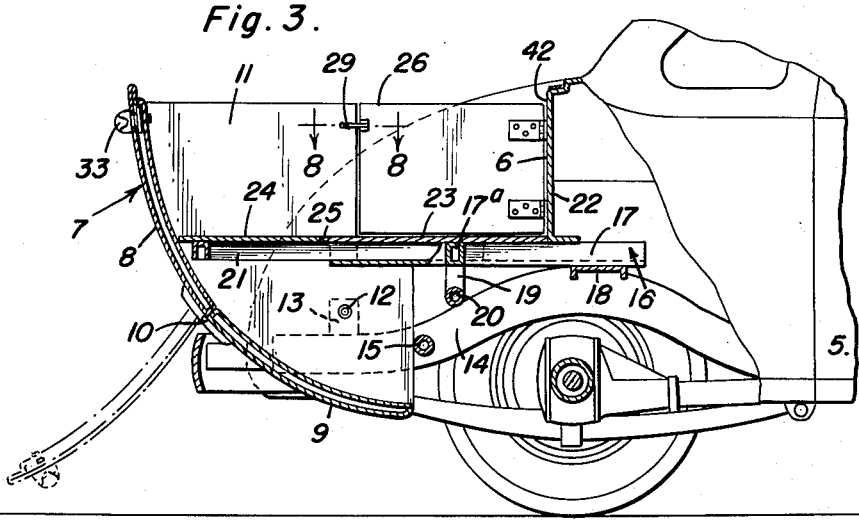
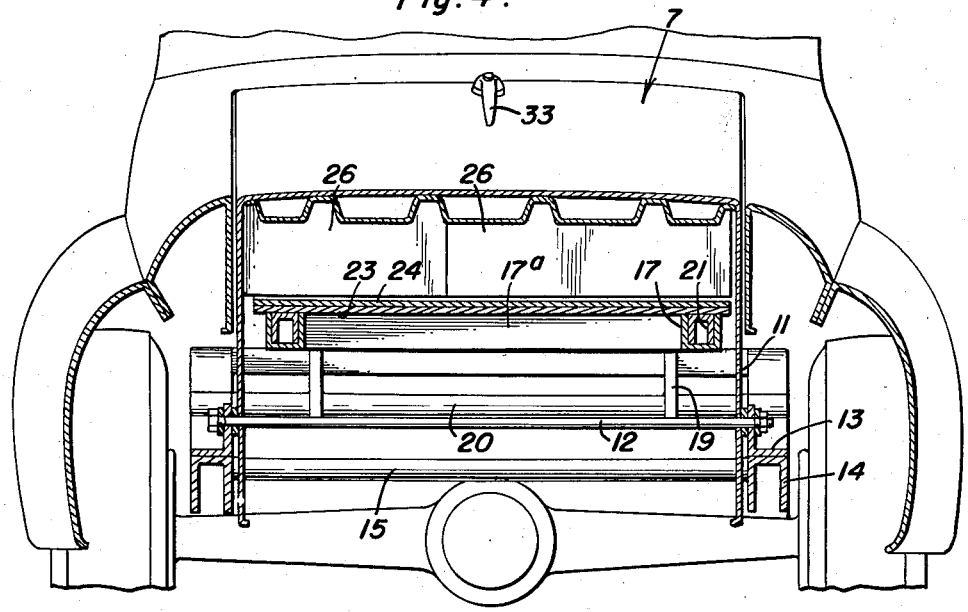
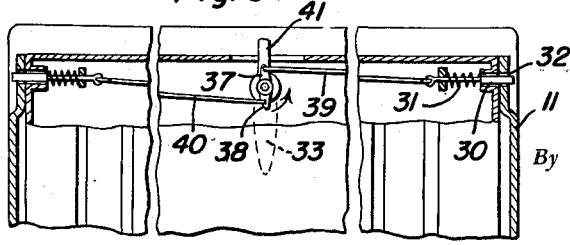
Inventor
Fermin Cabrera Gonzalez
By Clarence A. O'Brien
and Harvey B. Jacobson
Attorneys Patented Jan. 20, 1953

2,626,179

UNITED STATES PATENT OFFICE 2,626,179

CONVERTIBLE TRUCK AND TRUNK COMPARTMENT FOR AUTOMOBILES

Fermin Cabrera Gonzalez, Tampa, Fla.

Application December 2, 1949, Serial No. 130,805

3 Claims. (Cl. 296—26)

The present invention relates to new and useful improvements in convertible automobiles and more particularly to a convertible truck and trunk compartment.

An important object of the invention is to provide a trunk compartment for coupes constructed for converting into an open truck.

A further object is to provide a trunk compartment having foldable sides and a foldable bottom to form a truck body, and an extensible frame for the bottom for retracting into a position in the body of the vehicle when the door of the trunk compartment is closed.

Another object is to provide a convertible automobile body of simple and practical construction, which is neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view showing the trunk compartment open and with parts shown in section;

Figure 3 is a longitudinal sectional view taken on a line 3—3 of Figure 2;

Figure 4 is a transverse sectional view taken on a line 4—4 of Figure 1;

Figure 5 is a transverse sectional view taken on a line 5—5 of Figure 2;

Figure 6 is an enlarged sectional view of the lock for the trunk taken on a line 6—6 of Figure 2;

Figure 7 is a sectional view taken on a line 7—7 of Figure 6, and,

Figure 8 is an enlarged sectional view of the lock for the foldable sides taken on a line 8—8 of Figure 3.

Referring now to the drawings in detail, wherein for the purpose of illustration I have disclosed a preferred embodiment of my invention, the numeral 5 designates a coupe style automobile having a rear trunk compartment 6 provided with a door 7. The door is formed of upper and lower sections 8 and 9 hingedly connected to each other by hinge structures 10 for swinging the upper section 8 downwardly at the rear of the lower section 9.

Lower section 9 is provided with sides 11 pivoted on a transverse rod 12 which extends through the sides, the rod being supported on brackets 13 welded or otherwise suitably secured on the vehicle frame 14. The sides 11 are positioned inwardly of the frame 14 and a transverse rod 15 is welded or otherwise suitably secured at its end to frame 14 in a position to form a stop for engagement by an edge of sides 11 to hold the door 7 in its open position.

An extensible frame 16 is positioned in trunk compartment 6 and is composed of a pair of fixed channel side frames 17 which are welded or otherwise suitably secured at their front ends to a cross frame member 18 of frame 14 and a transverse bar 17-a is welded at its ends to side frames 17. Vertical supports 19 are welded at their upper ends to transverse bar 17-a and are welded at their lower ends to a transverse rod 20, which in turn is welded at its ends to frame 14. A U-shaped rear frame 21 is slidable in fixed side frames 17 for movement into an extended or retracted position in trunk compartment 6. The front wall 22 of the trunk compartment rises from fixed frame members 17.

A fixed front bottom or floor section 23 is suitably secured on top of side frame members 17 and a folding rear bottom or floor section 24 is connected to the rear edge of front floor section 23 by hinges 25 for folding on top of the fixed front section and when opened rests on sliding U-shaped frame 21.

Folding sides 26 are provided for the trunk compartment 6 and are hinged to front wall 22 for folding against the latter. Fasteners 29 connect sides 26 to the upper portion of the sides 11 carried by the lower door section 9. Sliding bolts 30 carried by the upper door section 8 are projected by springs 31 into openings 32 in the upper rear portion of sides 11 to lock the door in its open position.

A door handle is shown at 33 for door 7 and includes a squared shaft 34 to which an internally squared inner collar 35 is secured and on which an outer collar 36 is rotatable and provided with upper and lower arms 37 and 38 connected to the respective bolts 30 by pull rods 39 and 40. Fixed to inner collar 35 is a swinging latch 41 for entering an opening 42 in front wall 22 of the trunk compartment for locking trunk door 7. A dog 43 is formed on collar 35 and a dog 44 projects radially from outer collar 36 in the path of dog 43, when the latter is turned in one direction by handle 33 to pick up collar 36 and operate the latter in a delayed action to retract bolts 30.

In the operation of the device, trunk door 7 is opened by turning handle 33 to release catch 41 from opening 42 and swinging door 7 downwardly as a unit into the position shown by full lines in Figures 3. Sides 26 are then swung outwardly while bolts 30 remain in openings 32 and catches 29 are secured in position to rigidly hold the sides in open position.

U-shaped frame section 21 is then pulled rearwardly in guide frames 17 and foldable floor section 24 swung rearwardly on top of frame 21 and an open truck body is thus provided. When loading or unloading the truck, door section 8 may be unlocked by turning handle 33 to retract bolts 30 and door section 8 then swung downwardly into the position shown by dotted lines in Figure 3.

To close the trunk a reverse procedure is followed.

As will now be manifest, the door 7 when closed provides a top closure for the trunk compartment 6 with the lower side section 9 forming the rear wall of the compartment and the upper section 8 being swingable vertically to open the compartment, the sides of which are completely closed by the sides 11. The door 7 is mounted to the frame 14 by the sides 11 and rod 12 for vertical swinging, as a unit, into closed and open positions. In the closed position of the door 7 the other folding sides 26 are swung inwardly flat against the front wall 22 and the floor section 24 is swung forwardly and downwardly onto the fixed floor section 23, while the extensible frame 16 is slid forwardly into the channel side frames 17. When the door 7 is swung, as a unit, into open position, as shown in Figure 3, it forms, by the upper section 8, a rear wall for an extended compartment and is spaced from the fixed floor section 23, and said section 8 may be swung downwardly to open the rear of said compartment. When said door 7 is swung, as a unit, into open position, it spaces the sides 11 rearwardly from the front wall 6 so that the other, or folding sides 26, may be swung to close the spaces, as described. The folding floor section 24, as will be clear, bridges the space between the fixed floor section 23 and the rear wall formed by said section 8 when the door 7 is swung open, as a unit.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trunk compartment for an automobile comprising a front wall, a fixed floor section extending rearwardly from said front wall, a longitudinally curvilinear door for closing the compartment having sides for the compartment attached thereto, said sides being pivoted to said automobile below said floor section for vertical swinging to swing said door into open position and space said sides rearwardly from said front wall, said door when in open position extending above and below the level of said floor section, supplemental side sections for the compartment hinged to said front wall for swinging horizontally thereon to bridge the space between said sides and said front wall when said door is in open position, a supplemental floor section hinged to said fixed floor section for swinging into alignment therewith to bridge the space between said fixed floor section and said door when said door is in open position, and means to support said supplemental floor section in alignment with said fixed floor section.

2. A trunk compartment according to claim 1 wherein said means comprises a slidably extensible frame beneath said fixed floor section.

3. A trunk compartment according to claim 1 wherein one of said supplemental side sections is swingable flat against said front wall and the other supplemental side section is swingable into overlapping engagement with said one section when said door is closed.

FERMIN CABRERA GONZALEZ.

REFERENCES CITED

The following references are of record in the file of this patent:

UNITED STATES PATENTS

| Number | Name | Date |
|---|---|---|
| 1,150,954 | Murphy | Aug. 24, 1915 |
| 1,272,620 | Carlson | July 16, 1918 |
| 2,046,175 | Lim | June 30, 1936 |
| 2,518,342 | Lim | Aug. 8, 1950 |
| 2,552,898 | Lenci et al. | May 15, 1951 |

FOREIGN PATENTS

| Number | Country | Date |
|---|---|---|
| 19,811 | Australia | May 1, 1930 |
| 354,100 | Great Britain | Aug. 6, 1931 |
| 416,607 | Great Britain | Sept. 18, 1934 |